UNITED STATES PATENT OFFICE.

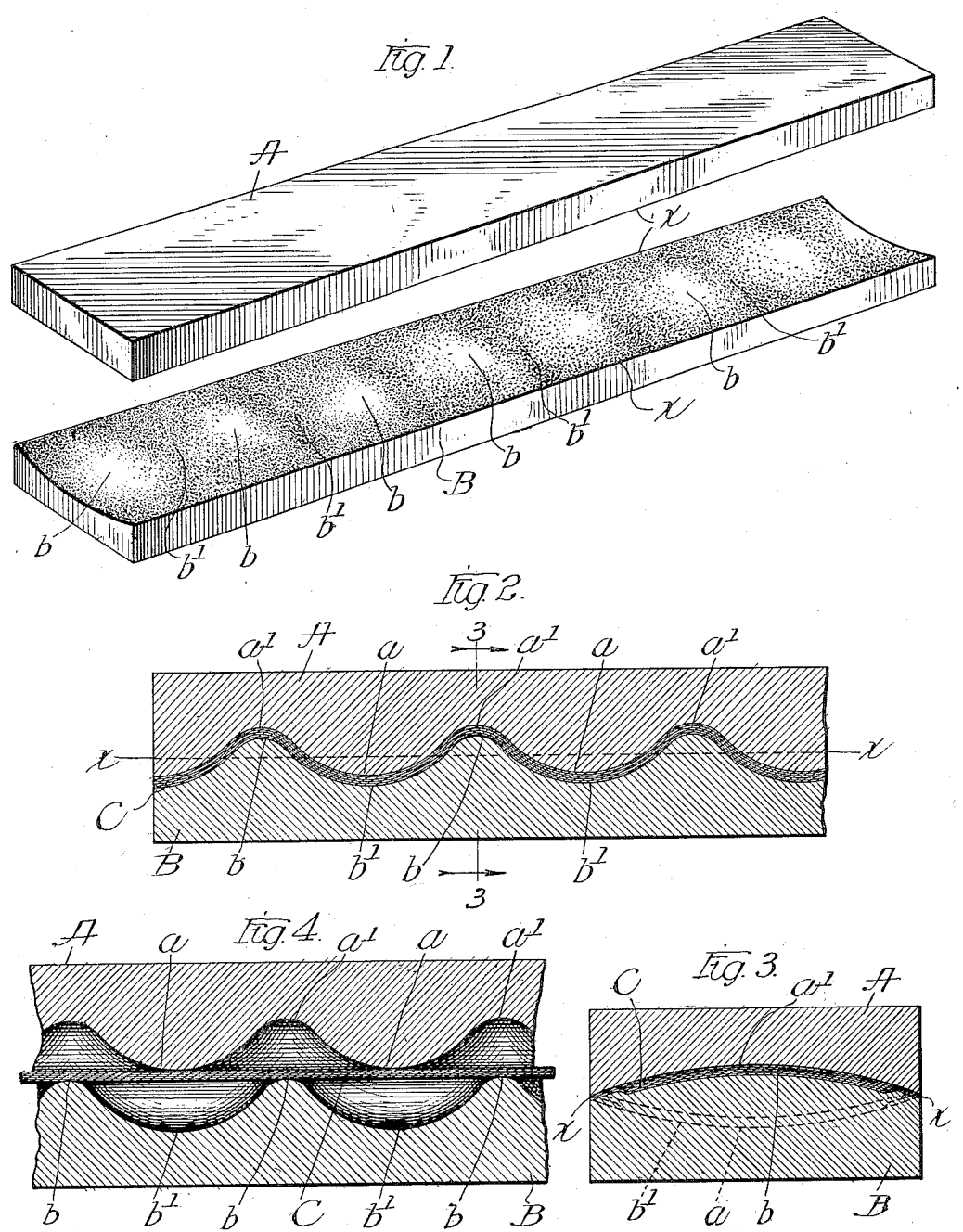

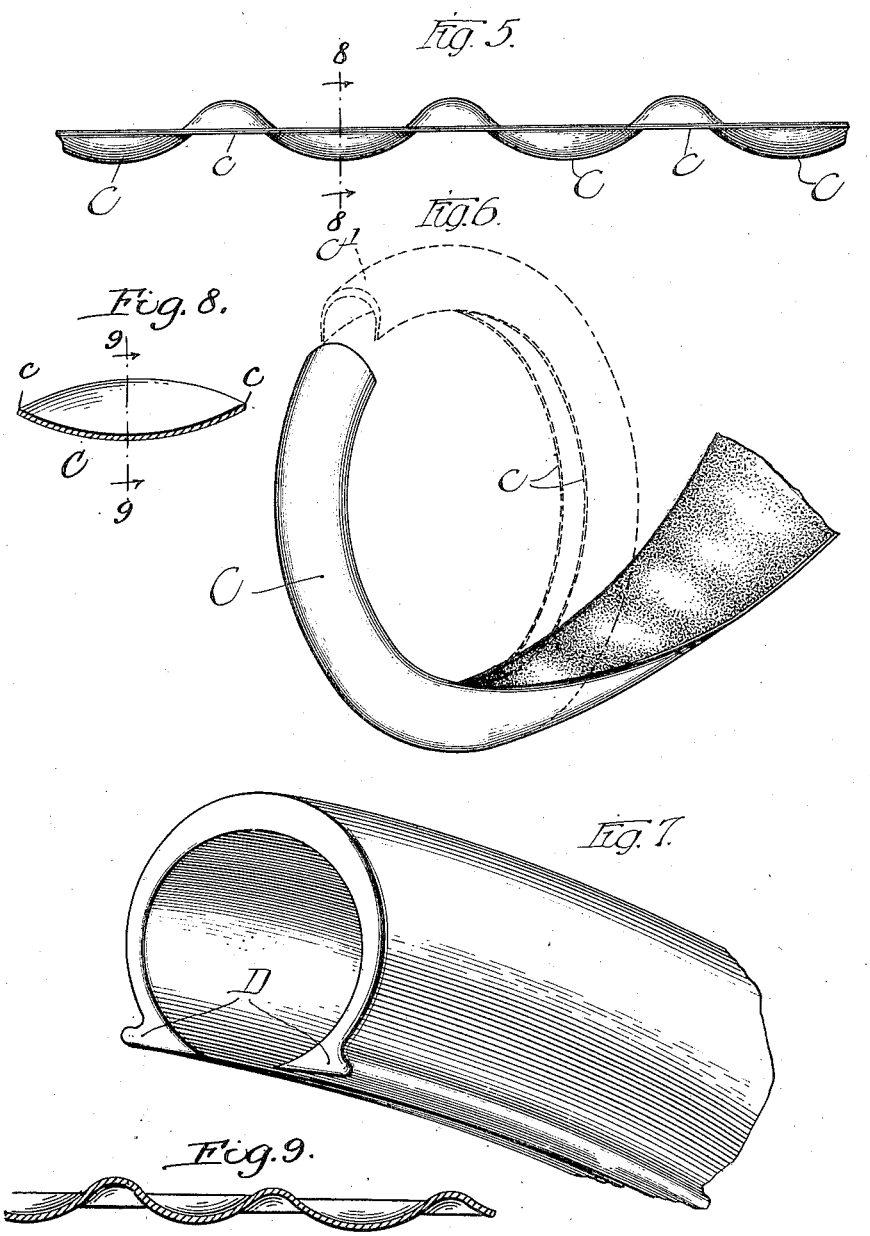

JOHN L. G. DYKES, OF CHICAGO, ILLINOIS.

PROCESS OF AND MEANS FOR MAKING RUBBER-TIRE ARTICLES.

1,210,154.      Specification of Letters Patent.      Patented Dec. 26, 1916.

Application filed January 29, 1914. Serial No. 815,174.

*To all whom it may concern:*

Be it known that I, JOHN L. G. DYKES, a citizen of the United States of America, and resident of Chicago, Cook county, Illinois, have invented a certain new and useful Improvement in Processes of and Means for Making Rubber-Tire Articles, of which the following is a specification.

My invention relates to the manufacture of rubber tire articles, such as pneumatic tires, outer casings, and reliners, all of which have heretofore been made on curved or circular mandrels, by first wrapping the sheets of rubber and fabric around the mandrel by hand, thus causing the materials to assume the form desired for the finished article, and by then subjecting the mandrel and its covering of rubber and fabric to pressure and heat in a hydraulic press or mold.

Generally stated, the object of my invention is to provide a novel and effective method of manufacturing articles of this kind at less cost than heretofore, and without the use of said mandrels, as will more fully appear.

To this and other useful ends my invention consists in matters hereinafter set forth and claimed.

In the accompanying drawings—Figure 1 is a perspective of the two part mold employed in practising my invention, which mold is also of a novel form, and showing the two parts separate. Fig. 2 is an enlarged longitudinal section of a portion of said mold, showing the sheets of rubber and fabric compressed in the desired manner. Fig. 3 is a transverse section on line 3—3 in Fig. 2. Fig. 4 is a view similar to Fig. 2, but showing the condition before the two parts of the mold are brought together. Fig. 5 is a side edge view of a portion of the so-called reliner made by the said mold. Fig. 6 is a perspective of the said reliner reduced to the shape necessary for use in the pneumatic tire, it being understood that Fig. 5 shows the condition and shape of the reliner when first removed from the mold. Fig. 7 is an enlarged perspective of a pneumatic tire casing made in accordance with my invention. Fig. 8 is a section on line 8—8 in Fig. 5. Fig. 9 is a section on line 9—9 in Fig. 8.

As thus illustrated, and referring to Figs. 1 to 4 inclusive, the mold for making the so-called reliner for pneumatic wheel tires comprises a pair of plates A and B having transverse corrugations formed in the faces thereof, which corrugations, when the two plates are together, with the sheets of cloth and rubber C between, are of the character shown in Fig. 2—that is to say, the corrugations in one plate fit the corrugations in the other plate. Thus each plate is provided with a longitudinal series of depressions alternating with elevations or ridges. These elevations and depressions are, however, of such character that they practically disappear at the side edges of each plate, as shown in Fig. 3, whereby the edges of the plates are straight, notwithstanding the transversely corrugated character of the surfaces thereof. Consequently, and when the fabric and rubber are removed from the plates, after being subjected to pressure and heat for the purpose of vulcanization, the reliner thus formed has straight parallel edges with corrugations or similar formations between said edges. The two side edges of the reliner are, therefore, practically straight, whereas the body portion of the reliner is wavy or undulated in character, and of such nature that if straightened out it would be much longer than the edge portions of the substantially flat strip of rubber and fabric thus formed. In other words, the upper plate is provided with transverse ridges $a$ which alternate with transverse depressions $a^1$, and the lower plate is provided with transverse ridges $b$ which alternate with transverse depressions $b^1$, the two plates being formed in such manner that they are adapted to fit together in the manner shown. Thus, and when the perfectly straight and flat sheets of fabric and rubber C are placed between the two plates, as shown in Fig. 4, and when the plates are then pressed together, the said materials are caused to conform to the shape of the plates. As stated, and by referring to Fig. 3, it will be seen that the alternating depressions and elevations of the two plates have inclined sides which terminate at the straight side edges of the plates, whereby each plate would be trough shaped if the protuberances or elevations were eliminated, or would be rounded and convex in cross section should the depressions be eliminated. Thus, and as stated, the central portion of the reliner, if pulled out straight, would be much longer than the side edges thereof.

A reliner thus made is caused to conform to the circular shape of the wheel in the following manner: The depressions in the outer surface of the reliner are pressed outwardly, by pressure on the inner surface of the reliner, whereby the waves or undulations of the reliner are, in effect, entirely eliminated, thus leaving the surface smooth and practically unbroken. As the central portion of the reliner is longer than the side edges thereof, it follows that this manipulation of materials, by pressing out the inwardly projecting portions thereof, serves in effect to lengthen the middle portion of the reliner, and the result is that the entire structure takes the form shown in Fig. 6. This is because the two parallel edge portions $c$ are, as stated, shorter than the middle or tread portion $c^1$ of the reliner, and for this reason the structure as a whole assumes a circular form, while in cross section it assumes a tubular or semi-tubular form. Thus, and with this method of manufacture, a rubber tire article, such as the reliner shown and described, is made in a stretched out or practically flat condition, and in a horizontal plane, which materially simplifies and cheapens the production of articles of manufacture of this kind. Heretofore, and as previously stated, reliners have been made on circular mandrels, in much the same manner as pneumatic tires are made, and by manually wrapping alternate layers of fabric and rubber upon the iron ring or mandrel employed for this purpose. With my improved method, however, all of this slow and laborious work is eliminated, and much time and expense are thereby saved; for with my improved method it is only necessary to lay sheets of fabric and rubber in place between the two members of the mold, and to then subject the mold to heat and pressure, thus simultaneously molding and vulcanizing the rubber article into the desired shape, but not the ultimate shape. When this has been done, and as shown and described, the reliner or other article is then ready to be manipulated by hand to cause it to assume the shape necessary for use on the vehicle wheel.

I do not limit myself to the production of reliners of the kind shown and described. Obviously, my invention may be employed in the production of rubber tires, such as shown in Fig. 7, and in that case the edges will be reinforced and properly shaped, as shown at D, the balance of the structure being substantially the same as the reliner previously described. In fact any rubber article now used on vehicle wheels, such as rubber tires, reliners, patches, etc., which are required to conform to the circular shape of the wheel, and which are of a tubular or semi-tubular nature when finished, can be produced by my improved method.

It will be seen, therefore, that my invention contemplates not only a new method of manufacturing rubber tire articles, and other rubber articles of similar character, in a manner calculated to materially reduce the cost of construction, but also contemplates a novel form of mold for use in the practice of said method or process. Also, and as a matter of further improvement, my invention contemplates a novel article of manufacture, to-wit:—a reliner or rubber tire which, in its normal condition, is practically flat or in a stretched out condition, but which is wavy or undulating along the longitudinal section thereof, thus providing a series of inwardly projecting portions which can be bent or pushed outward to cause the article as a whole to assume a circular or semi-circular form, as well as a tubular or semi-tubular form in cross section. Reliners and rubber tires of this character can be stored and shipped in a substantially flat condition, thus effecting economy in this direction also.

It will be understood, of course, that my invention can be used for the production of various kinds of rubber articles. As shown, the alternate depressions and elevations of the two members of the mold terminate at their opposite ends on lines $x$—$x$, which lines are disposed in a plane intersecting all of said elevations and depressions. In other words, the said lines $x$, when viewed from the side, and when the two members of the mold are together, as shown in Fig. 2, intersect the depressions and elevations of each member, whereby the center of each plate or member, if stretched or pulled out straight, would be much longer than the side edges thereof. As shown, these edges $x$ are straight and parallel, but it is obvious that they can be curved more or less, and that the entire mold can be formed on curve to some extent, without departing from the spirit of my invention. In other words, the reliner is made in a substantially flat or spread out condition, but by this I do not mean that it is necessarily made in a perfectly flat plane, as the said plane could be reduced more or less to a curve, or to the section of a cylindric surface, without thus departing from the scope of my invention. I have claimed the product in my divisional application Serial No. 93,090, filed April 24, 1916.

What I claim as my invention is:—

1. The process of making a rubber tire article for vehicle wheels from previously prepared sheet material, which comprises the molding of said article by the distortion of said material in a substantially flat or spread out condition thereof, but with resilient compound curves or undulations therein, thus forming alternate elevations and depressions along the tread, and then reversing one or more of said curves by flexing the material to cause the article to assume and thereby retain the shape necessary for the tread of the wheel.

2. The process of making a rubber tire article for vehicle wheels, from previously prepared sheet material, which comprises the molding of said article by the distortion of said material in a substantially flat or spread out condition thereof, but with resilient compound curves or undulations therein, thus forming alternate elevations and depressions along the tread, and then reversing one or more of said curves by flexing the material to cause the article to assume and thereby retain the shape necessary for the tread of the wheel, said molding operation also involving the stretching of the sheet material along the longitudinal center of the article, but not along the sides thereof, to insure the formation of substantially straight edges for said article, whereby the pressing outward of every other curve causes the said edges to move toward each other.

3. The process of making a rubber tire article for vehicle wheels, which comprises the molding of said article in a substantially flat or spread out condition, but with resilient compound curves or undulations therein, thus forming alternate elevations and depressions along the tread, and then reversing one or more of said curves by flexing the material to cause the article to assume and thereby retain the shape necessary for the tread of the wheel, serving also to place the tread portion under tension, said molding operation also involving the stretching of some portion of the sheet material and the formation of substantially straight edges for the sides of said article, whereby the subsequent pressing outward of one or more curves to complete the process causes the article to assume the curve of the wheel.

4. The process of making a rubber tire article for vehicle wheels, which comprises the molding of said article in a substantially flat or spread out condition, but with resilient compound curves or undulations therein, thus forming alternate elevations and depressions along the tread, and then reversing one or more of said curves by flexing the material to cause the article to assume and thereby retain the shape necessary for the tread of the wheel, the said molding operation being preceded by the superimposing of layers of plain sheet material in the plane of said operation, said molding operation involving the distortion of said layers to produce said curves or undulations therein.

5. A mold for making rubber articles from flat strips, comprising members formed with opposing surfaces, each surface having alternate depressions and elevations to distort the strips between the side edges thereof, the elevations of one member being opposite the depressions of the other member, and said depressions and elevations being disposed between and terminating at their opposite ends on lines which, when viewed from the side, intersect all said elevations and depressions, thereby to prevent longitudinal stretching of said edges.

6. A mold for making rubber articles from flat strips, comprising members formed with opposing surfaces, each surface having alternate depressions and elevations to distort the strips between the side edges thereof, the elevations of one member being opposite the depressions of the other member, and said depressions and elevations being disposed between and terminating at their opposite ends on lines which, when viewed from the side, intersect all said elevations and depressions, thereby to prevent longitudinal stretching of said edges, said lines being parallel and straight, whereby the depressions of each member from sections of a trough, these sections being separated by the elevations alternating therewith.

7. The process of making a rubber article from sheet material, which comprises the molding of said article after the disposition of said material in a substantially flat or spread out condition, thereby to produce compound curves or undulations therein, formed by distorting the strips between the side edges thereof, leaving said edges practically straight and unstretched, and then reversing one or more of said curves to cause the article to assume the shape necessary for use.

Signed by me at Chicago, Cook county, Illinois, this 19th day of January, 1914.

JOHN L. G. DYKES.

Witnesses:
  RACHEL J. RICHARDSON,
  ROSE E. SEHNEM.